United States Patent [19]

Brandt

[11] 4,383,068

[45] * May 10, 1983

[54] THIXOTROPIC COATING AGENTS BASED ON UREA ADDUCT OF POLYAMINE AND MONOISOCYANATE

[75] Inventor: Dieter Brandt, Eschweiler, Fed. Rep. of Germany

[73] Assignee: August Merckens Nachfolger Kommanditgesellschaft, Eschweiler, Fed. Rep. of Germany

[*] Notice: The portion of the term of this patent subsequent to Jul. 8, 1992, has been disclaimed.

[21] Appl. No.: 3,554

[22] Filed: Jan. 15, 1979

Related U.S. Application Data

[63] Continuation of Ser. No. 651,382, Jan. 22, 1976, abandoned, which is a continuation of Ser. No. 570,549, Apr. 22, 1975, abandoned, which is a continuation of Ser. No. 422,637, Dec. 7, 1973, abandoned.

[30] Foreign Application Priority Data

Dec. 11, 1972 [AT] Austria ................................ 10494/72
Mar. 28, 1973 [AT] Austria ................................. 2741/73

[51] Int. Cl.$^3$ .............................................. C08K 5/21
[52] U.S. Cl. .................................... 524/196; 524/197; 524/212

[58] Field of Search .................. 260/45.9 NC, 32.6 R, 260/32.6 PQ

[56] References Cited

U.S. PATENT DOCUMENTS

| | | | |
|---|---|---|---|
| 3,184,426 | 5/1965 | Thoma | 260/32.6 NR |
| 3,547,848 | 12/1970 | Marsh | 260/22 M |
| 3,663,506 | 5/1972 | Knopf | 260/45.9 NC |
| 3,893,956 | 7/1975 | Brandt | 260/18 TN |

OTHER PUBLICATIONS

A. Damusis, "Sealants", Reinhold Pub., New York, 1967, pp. 144–145.

*Primary Examiner*—Paul R. Michl
*Attorney, Agent, or Firm*—Felfe & Lynch

[57] ABSTRACT

A thixotropic coating agent, more especially a binder or coating composition, based on a mixtrue of conventional binder-containing systems, optionally in admixture with liquid solvents or diluents, and a thixotropizing agent containing urea groups, wherein the thixotropizing agent is, in part at least, a urea adduct obtained by reacting (a) primary and, optionally, secondary polyamines, (b) monoisocyanate compounds and, optionally, (c) diisocyanate compounds in the presence of at least part of the binder.

19 Claims, No Drawings

THIXOTROPIC COATING AGENTS BASED ON UREA ADDUCT OF POLYAMINE AND MONOISOCYANATE

This is a continuation of application Ser. No. 651,382, filed Jan. 22, 1976, now abandoned. Ser. No. 651,382 is a continuation of Ser. No. 570,549 filed Apr. 22, 1975 and now abandoned which is a continuation of Ser. No. 422,637, filed Dec. 7, 1973 and now abandoned.

Thixotropic coating agents, especially highly thixotropic coating agents based on lacquers, paints or other coatings, can be used with advantage in cases where the application of thick-layer lacquer systems is required. In this connection, the use of thixotropizing agents can also be of crucial significance in obtaining a stable state of admixture in the finished coating agent. Several proposals have already been made for thixotropizing binder-containing coating systems. For example, it is known that coating agents based on drying or non-drying fatty oils can be reacted with diisocyanates and heated to high temperatures. According to another proposal, triglycerides of drying or non-drying oils are initially transesterified with polyalcohols and the reaction mixture subsequently reacted with diisocyanates in the presence of catalysts. The diisocyanates and polyalcohols are used in equivalent or substantially equivalent quantities and are required to have a symmetrical molecular structure. According to other proposals, vegetable oils for example are reacted with organic amino compounds, for example aliphatic diprimary amines, to form a thixotropic substance. Thus, it has been proposed to add certain polyamide resins to ester-like lacquer starting materials, followed by boiling, optionally in a multistage process, until thixotropic properties appear.

It is known from German Auslegeschrift No. 1,805,693 that coating agents based on a mixture of a solvent-containing lacquer or a paint with conventional binders can be thixotropized by the addition of 0.05 to 10% by weight of a urea adduct obtained by reading an aliphatic monoamine with 6 to 22 carbon atoms with an aromatic or aliphatic monoisocyanate or polyisocyanate in an organic solvent, the molar ratio of amine to isocyanate lying between the stoichiometric ratio and a 40% excess of amine. More particularly, German Auslegeschrift No. 1,805,693 proposes initially preparing a gel in a separate process, comprising reacting the isocyanate compounds with the specified monoamines in a lacquer solvent, and subsequently working this gel into the binder-containing coating agent. However, the specified urea adduct can also be prepared in situ in the presence of the binder.

The practical requirements which a thixotropizing agent or a thixotropic coating system has to satisfy are manifold and, for this reason, are difficult to satisfy at one and the same time. In thixotropizing coating agents, it is of course not only a question of thickening a coatable system, on the contrary a whole range of special properties is required. Thus, the thixotropized system is required to be readily stirrable or spreadable, in spite of its gel character, whilst on the other hand the gel-like character is required to be reformed almost instantaneously once the effect of mechanical stressing has been removed. In the fresh thick-layer coating, the freshly applied layer of coating agent is required to level to a certain extent in order to equalise irregularities in the coating by free flow. On the other hand, fresh thick-layer thixotropic coatings are in danger of "running", especially when applied to vertical walls. Particular problems arise in cases where coating agents contain heavy pigments, for example iron mica, as is the case in particular with anti-corrosion coatings. However, it is in this very field that there is an increasing demand for effective thixotropic coating agent systems in order to simplify and shorten the extremely labour-intensive work involved in the protection of large steel structures.

The object of the invention is to provide a thixotropizing agent or thixotropic binders and, hence, thixotropic coating agents which are distinguished by a wider range of variation in their combination of properties than it has been possible to obtain with certain conventional thixotropizing agents.

In broad terms, this object is achieved by reacting primary and/or secondary polyamines, i.e. amine compounds containing at least two of the aforementioned amino groups, with monoisocyanates and optionally diisocyanates; it is also possible by using certain monofunctional compounds, to arrest any excess of still free isocyanate groups with these monofunctional components. By varying the ratio of polyamine to the monofunctional isocyanate compounds and the difunctional isocyanate compounds used, if any, it is possible in accordance with the invention to provide the thixotropic coating agent specifically with a wider range of desirable properties than can be achieved with conventional thixotropizing agents. Another essential feature of the invention is that the urea adduct is prepared in the presence of at least part of the binder. Accordingly, a first embodiment of the invention relates to thixotropic coating agents, especially binders or coating compositions based on a mixture of conventional binder-containing systems, optionally in admixture with liquid solvents or diluents and a thixotropizing agent containing urea groups, distinguished by the fact that the thixotropizing agent is, at least in part, a urea adduct obtained by reacting (a) primary and optionally secondary polyamines with (b) monoisocyanate compounds and optionally (c) diisocyanate compounds, in the presence of at least part of the binder.

The thixotropic coating agents according to the invention can be complete coating agents in the form of lacquers, paints, varnishes or synthetic coatings, although the invention also covers in particular thixotropized binders and binder-solvent systems. Thixotropic binders of this kind can be directly used by the manufacturer of the complete coating agent to prepare ready-to-use thixotropic coating agents.

According to the invention, the polyurea adduct used as thixotropizing agent is present in a quantity of preferably 0.05 to 10% by weight, more especially in a quantity of about 0.1 to 5% by weight, based on the thixotropized system.

Another embodiment of the invention relates to a process for producing thixotropic coating agents, more especially binders or coating compositions, of this kind, distinguished by the fact that a liquid binder or a binder-containing liquid mixture is thoroughly mixed with the primary and/or secondary polyamines and the resulting mixture subsequently reacted with the isocyanate compounds.

Particularly preferred embodiments of this process will now be described.

Through the formation of a polyurea system, a more or less heavily developed thixotropic effect occurs in many cases almost at once or after a certain period of standing, for example after about 24 hours. The extent of this thixotropic effect can be predetermined in any one case by simple small-scale tests. A wide variation of combined property characteristics can be determined in advance and standardised by adapting the quantities of components selected for forming the thixotropizing agent and optionally by selecting and using particularly appropriate binder systems.

To form the thixotropizing agent according to the invention, the isocyanate compounds as a whole are preferably used in such a quantity that from 40 to 200 equivalent % of isocyanate groups are present, based on the isocyanate-reactive primary and, optionally, secondary amino groups of the polyamines. The isocyanate compounds are preferably used in quantities of from 80 to 140 equivalent % of isocyanate groups, based on primary and/or secondary amino groups. The monoisocyanates and the diisocyanates can be used in the following mixing ratios: from 0 to 95 equivalent %, preferably from 30 to 70 equivalent %, of isocyanate groups from the diisocyanate compounds to 100 to 5 equivalent %, preferably 70 to 30 equivalent %, of the monoisocyanate compounds. It can be of particular advantage to limit the quantity of diisocyanates present, if any, in such a way that the primary and/or secondary amino groups of the polyamine are present in a stoichiometric excess relative to the isocyanate groups from the diisocyanates.

An excess of free amino groups or an excess of free isocyanate groups can initially be present, depending upon the relative quantitative ratios selected between reactive isocyanate groups and primary and/or secondary amino groups reacting with those groups. At most as many reactive amino groups are used in the polyamine as there are amino groups available for the reaction, especially in all cases where the presence of free amino groups in the finished coating agent is undesirable. The use of an excess of isocyanate groups over reactive amino groups can be of particular advantage. One alternative, which falls within the scope of the invention, is to use other reactive components which are able to arrest undesirable free amino groups. Epoxide compounds are particularly suitable for this purpose.

However, an excess of free isocyanate groups could also give rise to undesirable secondary reactions in the binder or coating agent. Accordingly, it is preferred in accordance with the invention to block this quota of excess free isocyanate groups by using monofunctional isocyanate-reactive components. Monofunctional amines and in particular monofunctional alcohols or monofunctional oximes can be used for this purpose. One particular example of monofunctional amines are alkanolamines which actually contain two isocyanate-reactive groups. However, on account of the considerably increased reactivity of the amino group, these groups will always react first with any isocyanate groups still present so that an additional reaction of the hydroxyl group of the alkanolamine could only be considered if, after all the amino groups have been consumed, there are still some free isocyanate groups which have not been arrested by other reaction components in the meantime. In fact, it is preferred in accordance with the invention to use even the alkanolamines themselves as monofunctional components in this case.

For forming the thixotropizing urea adduct in accordance with the invention, the different reaction velocities between the aforementioned components are of significance and the invention makes effective use of these very differences in reaction velocity. The highest reaction velocity occurs between isocyanate groups and amino groups. By contrast, the reaction between isocyanate groups and alcoholic groups proceeds much more slowly. If, therefore, the polyamines are initially reacted with monoisocyanates and, optionally, diisocyanates in excess, the amino groups are completely arrested even in cases where other monofunctional components, such as monohydric alcohols or monofunctional oximes, are simultaneously added to the reaction mixture. In fact, components of this kind can be present in a considerable quantity. The isocyanate used in excess initially safely arrests all the amino groups, after which the isocyanate excess reacts in a slower, following reaction with for example already present or subsequently added monofunctional alcohol which in turn can be present in an excess over the quantity required for reaction with the isocyanate excess.

In the context of the invention, polyamines are primary and/or secondary amines which contain at least two of these isocyanate-reactive amino groups. Diamines, especially diprimary amines (primary diamines), can be used with particular advantage. In addition to or instead of these diamines, however, it is also possible to use tri- and higher polyamines. According to the invention, however, it is preferred only to use these higher polyamines in admixture with diamines, for example in such ratios that substantially equivalent quantities of diamine and higher polyamine are present.

Examples of higher polyamines include diethylene triamine to pentaethylene hexamine, or dipropylene triamine to pentapropylene hexamine. The reactive diamines particularly preferred for the purposes of the invention can be cycloaliphatic and/or aromatic and, at the same time, optionally polynuclear, although it is also possible, either wholly or in part, to use aliphatic diamines.

Polyamines with which favourable results have been obtained in accordance with the invention are, for example, 3,3'-dimethyl-4,4'-diaminodicyclohexyl methane, 4,4'-diamino dicyclohexyl methane, 4,4'-diaminodiphenyl methane, ethylene diamine, hexamethylene diamine, N-aminoethyl piperazine, xylylene diamines, 1,3,5-triisopropylbenzene-2,4-diamine, 1,3-diisopropylbenzene-2,4-diamine, 2,4-diaminomethyl-1,3-dimethylbenzene or 3-aminomethyl-3,5,5-trimethylcyclohexylamine. One particularly favourable and highly active diamine in the context of the invention is di-(aminomethyl)-benzene.

Monoisocyanate compounds in the context of the invention are aliphatic, aromatic and/or cycloaliphatic monoisocyanates. The aliphatic monoisocyanates can contain for example up to 25 carbon atoms. Both in this case, and in the case of the aromatic and cycloaliphatic monoisocyanates, it is particularly preferred to use commercially available, inexpensive compounds. Examples include: alkyl isocyanates with 1 to 22 carbon atoms, for example methyl isocyanate, ethyl isocyanate, propyl isocyanate, butyl isocyanate, stearyl isocyanate, secondary alkyl isocyanates such as tert.-butyl isocyanate and/or aromatic isocyanates such as phenyl isocyanate, 1-naphthyl isocyanate, tolyl isocyanates, toluene sulphonyl isocyanate or even cycloaliphatic isocyanates, such as cyclohexyl isocyanate.

Suitable diisocyanate compounds include both aromatic and cycloaliphatic, optionally polynuclear diisocyanates and/or aliphatic diisocyanates. Examples of suitable commercially available compounds of this class include aliphatic diisocyanates with at least two carbon atoms, such as ethylene-1,2-diisocyanate and hexamethylene-1,6-diisocyanate or an isomer mixture of 2,2,4- and 2,4,4-trimethylhexamethylene diisocyanate. Aromatic diisocyanate compounds are particularly suitable, for example the known isomer mixtures of 65% of tolylene-2,4-diisocyanate and 35% of tolylene-2,6diisocyanate, and isocyanate mixtures containing 80% of the 2,4-isomer and 20% of the 2,6-isomer. Other suitable aromatic diisocyanates include diphenylmethane-4,4′-diisocyanate or naphthylene-1,5-diisocyanate. 3-Isocyanatomethyl-3,5,5-trimethylcyclohexyl isocyanate is one example of a cycloaliphatic diisocyanate suitable for the purposes of the invention.

All the reactive diamino compounds and diisocyanates mentioned here are suitable for thixotropizing. 3,3′-Dimethyl-4,4′-diaminodicyclohexyl methane, xylylene diamine and 4,4′-diaminodiphenyl methane, are particularly effective.

Among the isocyanates, diphenylmethane-4,4′-diisocyanate, tolylene-2,6-diisocyanate and naphthylene-1,5-diisocyanate in particular show pronounced thixotropic effects. In this case, too, however, all the described diisocyanates are basically suitable. The only difference between them lies in their effectiveness. Allowance can be made for this difference in selecting the quantity of polyurea-forming components. Thus, it is possible by selecting a larger quantity of components with a weaker action to obtain a thickening effect equivalent to that obtained by using smaller quantities of components with a stronger thixotropic action.

In the case of aliphatic diisocyanates, symmetry in structure has a positive effect in regard to their effectiveness as thixotropizing component. For example, hexamethylene-1,6-diisocyanate is more effective than 2,2,4- or 2,4,4-trimethylhexamethylene-1,6-diisocyanate.

It has also been found that alkyl groups in particular, such as methyl and isopropyl radicals as substituents in the vicinity of the NCO-group, i.e. in the o-position, have a particularly favourable effect upon the thixotropizing properties of aromatic diisocyanates. If two methyl or isopropyl groups are symmetrically adjacent the isocyanate groups, the effect of the diisocyanate becomes even more favourable. 1,3,5-Triisopropyl benzene-2,4-diisocyanate for example shows the most pronounced thixotropizing properties. The effect of 1,3-diisopropylbenzene-2,4-diisocyanate, tolylene-2,6-diisocyanate, 2,4-diisocyanatomethyl-1,3-dimethylbenzene is not quite so strong, whilst tolylene-2,4-diisocyanate and hexamethylene-1,6-diisocyanate have an even somewhat weaker thixotropizing effect.

A certain parallel can be found amongst diamines. 3,3′ -Dimethyl-4,4′-diaminodicyclomethane is significantly more effective than 4,4′-diaminodicyclohexyl methane, whilst o-phenylene diamine is significantly more effective than m- and p-phenylene diamine which produce equivalent thixotropic binders.

Secondary diamines of aliphatic structure which do not contain any primary amino groups have to be used in extremely high concentrations to obtain even a weak thixotropic effect. Ethylene diamine for example provides a strong thixotropic effect, whereas the corresponding N,N′-diethyl derivative is considerably less effective. By contrast, heterocyclic diamines which secondary amino groups only, for example piperazine, are extremely effective. This diamine is as effective as 3,3′-dimethyl-4,4′-diamino dicyclohexyl methane.

So far as aliphatic diamines are concerned, it can generally be said that not only do short-chain diamines provide particularly favourable effects, long-chain diamines, for example 1,12-diaminododecane, are also valuable components in accordance with the invention. Tri- and higher polyamines suitable for the purposes of the invention include in particular aliphatic polyamines with 3 to 6 amino groups in the molecule, of which the terminal groups are primary amino groups and the rest secondary amino groups.

Monoalcohols in the context of the invention are in particular adequately volatile monofunctional alcohols of aliphatic and/or cycloaliphatic structure. Aliphatic monoalcohols with 1 to 7 carbon atoms and cycloaliphatic lower alcohols, especially cyclohexanol, are particularly suitable. It is also possible to use alcohols of higher molecular weight. In their case, however, one factor which has to be taken into consideration is that, as a rule, the alcohols can be used in almost any excess so that, in most cases, a considerable proportion of the alcohols does not take part in the reaction by which the thixotropizing agent is formed. Accordingly, it should be possible for this alcohol excess to be able to be evaporated from the binder or from the paint produced with it so that it does not leave behind any adverse effects upon the properties of the binder or paint. In addition to the aforementioned monoalcohols, it is also possible to use lower ether alcohols in particular (monoethers of glycols). Examples include methyl-, ethyl-, propyl- or butyl-glycol monoether, and the corresponding semi-esters of glycols.

Similar considerations affect the choice of the oximes as monofunctional reaction components. In this case, volatile or evaporating components are preferred, ketoximes and aldoximes containing up to 6 carbon atoms being particularly suitable.

Both the monoalcohols and also the oximes can be used in a considerable excess over the quantity required for blocking free isocyanate groups. This generally does not apply in cases where monoamines are used because the monoamine is preferably employed in only such a quantity that no appreciable numbers of free amino groups are present after formation of the urea adduct. Although basically it is possible to use an excess of monoamine, this generally does not produce any improvement in thixotropy. In the case of binders which dry by oxidation, an excess of free amino groups can be harmful, resulting in particular in much slower drying. Suitable monoamines are, in particular, primary monoamines of aliphatic, cycloaliphatic and heterocyclic structure. Compounds containing 1 to 25 or even more carbon atoms can be considered. Secondary monoamines of aliphatic or cycloaliphatic structure, for example dibutylamine or dicyclohexyl amine, are also suitable for arresting the still free isocyanate groups. However, monoamines of this kind have little or no effect in increasing thixotropy, whereas primary monoamines may even develop their own effect.

Among the class of alkanolamines, it is possible to use alcohols containing primary or secondary amino groups. The general principles stated above apply in this case, too, especially as regards the amino group, namely that no appreciable excess over the NCO-groups ready for reaction should be used. Lower aliphatic alkanolamines in particular are especially significant for practical application.

In general, the viscosity of the binder or binder-containing system is reduced in cases where solvents containing hydroxyl groups are used for thixotropizing in accordance with the invention. This makes it easier to prepare the thixotropizing agent in the presence of the binder. The same applies in cases where the binders are dissolved in non-reactive solvents, for example in aliphatic or aromatic hydrocarbons, esters, ketones, ethers and the like. However, the coating agents according to the invention are generally distinguished by considerable binder contents. Thus, the binder is preferably present in the thixotropized system in a quantity of at least 20% by weight. It may be of advantage to use even larger quantities of binder in the system, for example at least 30% by weight or 40% by weight or more. In important applications of the invention, the binder makes up more than half the total mixture.

Suitable binders include almost all the components that have already been proposed in the coating art. A thixotropizing effect can be obtained in almost every case. Examples of particularly suitable binders include long-oil, middle-oil or short-oil or even oil-free alkyd resins, stand oils, linseed oil/linseed oil-stand oil combinations, urethane-, epoxy resin-, acrylic resin- and styrene-modified alkyd resins, PVC-copolymers, cyclorubbers, oil-modified epoxies, water-dilutable alkyd resins in their non-neutralised form and similar components.

However, the invention can also be applied with advantage for example in the case of unsaturated polyester resins or mixtures thereof with copolymerisable monomers, such as styrene, methacrylate or similar ethylenically unsaturated compounds. Another interesting field of application for the invention are the so-called solvent-free binder systems, i.e. comparatively low-viscosity condensates which are used without, or only with small quantities of, solvents. Suitable acid binders in non-neutralised form are, for example, binders of this kind with acid numbers of from 20 to 120, preferably from about 30 to 90. However, the system according to the invention is also suitable for thixotropizing water-dilutable binders which are neutralisation products or at least partially neutralised products of binders which, in their non-neutralised form, have an acid number of 20 to 120, preferably 30 to 90. From the extensive prior art on the quality of binders, reference is made to British Patent Specification No. 1,230,605 and the literature quoted therein, and to the book by Wagner-Sarx "Lackkenstharze", 5th Edition, 1971, Carl Henser Verlag, Munich.

Individual binders can respond differently to the thixotropizing effect. If it is desired to intensify the effect of binder systems having only a weak response in thixotropizing according to the invention all that is necessary is for example to use limited quantities of a compatible and, at the same time, high-response binder in order overall to obtain a highly thixotropic composition.

In another embodiment of the invention, it is possible to thixotropize only part of the binder of the finished composition in the presence of the reactive components of the invention. In this embodiment, exaggerated thixotropy is obtained in regard to this part of the binder. The gel thus obtained is subsequently mixed with non-thixotropized binder and/or solvent or diluent until the required state is reached. This possibility embodies another important simplification for adjusting predeterminable property combinations in the end products.

Well developed thixotropic properties and, in most cases, clear gels are obtained by initially introducing the diamine into the binder and subsequently adding the monoisocyanate and optionally diisocyanate, optionally diluted with solvent. According to one particularly important aspect of the invention, however, the properties of the thixotropizing agent can be influenced by a sequence of certain process stages.

In this embodiment, not only is the polyamine together with the monofunctional components present, if any, mixed with a binder before polyurea formation, the isocyanates are also preferably combined with part of the binder or binder-containing mixture before the components are reacted.

In the particularly important embodiment referred to above, the reaction is carried out by homogeneously distributing the monoisocyanates and optionally diiocyanates in part of the liquid binder or binder-containing liquid mixture and subsequently introducing the polyamines, again best dissolved in binder, into the diisocyanate immediately afterwards. This ensures that isocyanate groups are present in excess at least during the greater part of the urea-forming reaction. It can be of particular advantage for this purpose to establish an excess of isocyanate during selection of the stoichiometric ratio of reactive amino groups and isocyanate groups, so that free isocyanate groups are present in excess up to the end of the reaction of the amino groups. The isocyanate groups that are not arrested by amino groups are reacted with the monofunctional components also used in this case.

The special addition of the polyamide to the isocyanate excess, as described above, results in the formation of thixotropic materials which, hitherto, it has not been possible to obtain in the combination of their favourable properties. The thixotropized coating agent or binder has a soft-pasty consistency, i.e. it is easy to spread. Nevertheless, it does not run, even in thick layers, when applied to vertical surfaces. On the other hand, this soft-pasty material levels to an adequate extent so that irregularities arising out of application of the coating agent to the substrate to be coated are satisfactorily equalised in the required manner. Thixotropized coating agents prepared in this way are clearly distinguished in the particularly advantageous combination of their properites from those in whose case the diisocyanate is introduced into the polyamine-containing reaction component.

Reaction of the polyamines with the diisocyanate compounds and, optionally, the monofunctional components in the presence of the binder can be carried out at room temperature. However, the effect of the thixotropizing additive can be considerably increased in many cases by carrying out the reaction at elevated temperatures. Temperatures in the range from about 40° to 100° C. are particularly suitable for this purpose, temperatures in the range from 50° to about 80° C. being particularly preferred. Another possibility for intensifying the effect of the gel is to carry out the reaction at room temperature and subsequently to heat the thixotropized material for example to temperatures of up to about 80° C. Temperatures in the range from room temperature to about 100° C., more particularly in the range from room temperature to about 70° C., are generally suitable for preparation of the polyureas. The thixotropic gel formed in the presence of binders is remarkably stable and, in particular, represents an irreversible gel largely unaffected by temperature.

This resistance of the thixotropic state to temperature, even high temperatures such as those normally applied for stoving purposes, makes the invention particularly suitable for use in the field of heat-drying or heat-reactive binders and coating systems. Accordingly, one particularly preferred aspect of the invention is the use of the addition products containing urea groups prepared in the presence of polymeric compounds as heat-stable thixotropizing agents in heat-drying polymer compositions, for example in so-called stoving lacquers.

One particularly interesting field of the kind in question here is the production of heat-hardened coatings on metal components for example by applying so-called heat-drying lacquers and, in particular, stoving lacquers and primers. These processes are widely used in industry, for example in the manufacture of car bodies, domestic appliances, such as washing or rinsing machines, refrigerators or in the production of so-called band coatings by the coil-coating technique. Industry has developed a large number of thermosetting systems which are normally hardened at temperatures of from about 70° to 300° C. or even higher. The invention is particularly suitable for this field of heat-reactive coating agents, more especially heat-drying lacquers, stoving lacquers and primers based for example on thermosetting aminoplasts, autocrosslinking or crosslink-assisted acrylate resins, thermosetting alkyd resins and/or epoxide resins. The heat-reactive binder systems mentioned here can be used as known per se in admixture with other binder components, as known from the numerous proposals for the production of heat-hardenable systems. Among the extensive literature, reference is made in this connection to "Ullmann's Enzyklopadie der Technischen Chemie", 3rd Edition, Urban und Schwarzenberg, vol. 11, pages 279 to 364, and to the already mentioned book by Wagner-Sarx entitled "Lackkunstharze", in particular pages 61 to 80 and 230 to 235.

The invention can be of particular importance in the field of thermosetting stoving lacquers based on aminoplasts, more especially corresponding urea resins and/or melamine resins. The multicomponent lacquers plasticised by the addition of other binder systems are of particular importance in this respect. Plasticising systems of this kind are, for example, polyesters, drying or non-drying alkyd resins, epoxide resins, polyacrylates, also nitrocellulose or silicone-, acryl-, styrene-, vinyltoluene-modified alkyd resins or even oil-free alkyd resins.

The mixing ratios of the polymeric binders lie within the usual limits. Accordingly, the thermosetting, more especially etherified urea or melamine resin is preferably used in a deficit in relation to the other constituents of the binder.

It has proved to be of advantage in this very field of aminoplast-based stoving lacquers for the various process stages involved in the production of the thixotropized material to follow a certain order. Thus, it is of particular advantage to carry out in situ production of the urea adduct from isocyanate compounds and amines in the plasticising binder component rather than in the aminoplast component. The aminoplasts can readily show incompatibility with urea adducts if an attempt is made to carry out in situ formation of the urea in the aminoplast phase. This gives rise to hazing phenomena which may be attributable to some precipitation of the polyurea molecule formed and the effect of which can be that the thixotropic effect is not fully developed.

Accordingly, it is more effective to carry out in situ formation of the urea adduct in the plasticising binder component and subsequently to mix the binder thixotropized in this way with the heat-reactive aminoplast component. In this way, the thixotropic effect is no longer impaired.

In addition, the invention is of particular importance in connection with acrylate resins both of the autocrosslinking and of the crosslink-assisted type. Both types can be satisfactorily thixotropized by in situ formation of urea adduct in their presence so that they can be used either as such or in admixture with components introduced into them, for example alkyd resins and/or other binder components as listed above, as binding phase for the thixotropizing agent. The autocrosslinking acrylate resins can be mixed for example in known manner with epoxide resins, alkyd resins or melamine resins, whilst the crosslink-assisted acrylate resins require in particular products containing methylol ether, such as urea resins or melamine resins, as stoving lacquers.

In cases where binders according to the invention containing methylol ether groups are directly thixotropized, it can be of advantage to bear the following in mind: binders of this kind, such as amino resins or acrylamideformaldehyde resins can obviously interact with the amines used to form the urea adduct. Accordingly, it is advisable in this and similar cases to add the isocyanates immediately after the binder has been mixed with the amines. By virtue of the particularly high reactivity of the isocyanate group with the amino groups, the urea adduct is formed before undesirable secondary reactions or interactions can occur.

In selecting the components for forming the urea adducts, it can be of advantage, especially in accordance with the stoving conditions required later on, to take into account colour stability in dependence upon the stoving temperature. It is known, for example from polyurethane chemistry, that aromatic diisocyanates, such as tolylene diisocyanate, can give rise at elevated temperatures to undesirable changes in colour reflected in the form of yellowing in the field of stoving lacquers in question here. Accordingly, in cases where high colour stability, especially at high temperatures, is required, it can be of advantage to use non-aromatic diisocyanates, for example cycloaliphatic and, in particular, aliphatic diisocyanates.

It has also been found that certain monoisocyanate compounds are particularly suitable for obtaining the required combination of properties in the thixotropized material by reaction with polyamines, especially diamines, in the presence of the binder. The monoisocyanates which are used for preparing the polyurea adduct in this embodiment are in turn reaction products of polyisocyanates and monoalcohols obtained by separately reacting polyisocyanates in the absence of the binder with such quantities of monoalcohols that about one free isocyanate group is left in the molecule. The monoisocyanates obtained in this way are then reacted with polyamines and, optionally, polyisocyanate compounds in the presence of all or at least part of the binder or coating agent to be thixotropized.

These monoisocyanates can be prepared for example with any of the diisocyanate compounds listed above for direct use. Diisocyanate compounds suitable for this purpose include both aromatic and cycloaliphatic, optionally polynuclear diisocyanates and/or aliphatic diisocyanates.

The production of monoisocyanate compounds of this kind with approximately one free isocyanate group in the molecule by reacting polyisocyanates and monofunctional alcohols is known per se. Reference is made in this connection to British Patent Specification No. 1,230,605 which describes a process for the production of thixotropic resins and resin solutions. In this process, corresponding monoisocyanate compounds are prepared by reacting polyisocyanates with monofunctional alcohols in a separate operation, followed by reaction with the binder itself and/or with water in the presence of the binder. Thixotropic binders are actually formed in this case, too. However, it has been found that the reaction cannot be adequately controlled, with the result that it is not possible with any degree of certainty to obtain reaction products with predetermined and required combinations of properties. In particular, the quantity of isocyanate compound required in this conventional process for obtaining adequate thixotropy is also relatively high.

It has surprisingly been found that monoisocyanates of the kind described here and in British Patent Specification No. 1,230,605 give particularly favourable combinations of properties in the thixotropized binder in a particularly reliable manner if, instead of being directly reacted with the binder or with water, they are reacted, in accordance with the invention, with polyamines in the presence of at least part of the binder to be thixotropized. The effect of the particularly fast reaction between isocyanate-reactive primary and/or secondary amino groups and the isocyanate groups is that it is possible, in accordance with the invention, to form polyurea adducts of exactly predetermined constitution which provide the binders or coating agents with the required combinations of properties in predetermined manner.

The monoisocyanate compounds can be prepared for example as described in British Patent Specification No. 1,230,605. In general, the polyisocyanate, preferably the diisocyanate selected, is reacted with the stoichiometrically necessary quantity of monoalcohol. The reaction can be carried out at room temperature, although it is preferably carried out at elevated temperatures. Temperatures of from 50° to 120° C. for example are particularly suitable. It can be of advantage to carry out this reaction in an inert solvent. It is preferred for this purpose to use solvents which, subsequently, can actually be left behind in the reaction system during thixotropizing of the binder or coating agent. The polyisocyanate is preferably initially introduced and the monoalcohol added with stirring in such a way that the reaction temperature lies for example in the range from about 50° to 100° C.

According to the invention, monoalcohols for the production of these monoisocyanate compounds are preferably primary monoalcohols, although basically it is also possible to use secondary or tertiary alcohols. According to the invention, it can be of advantage to use monoalcohols with at least 5 and preferably with at least 8 carbon atoms. Monoalcohols with 8 to 25 and more particularly with 9 to 17 carbon atoms for example are particularly suitable. The alcohols can be aliphatic, cycloaliphatic and also aromatic. The aliphatic alcohols can be linear or branched. Branched aliphatic alcohols can have particular significance. Instead of using simple alcohols of the kind described here, it is also possible to use semi esters and semi ethers of glycols. The alcohols themselves can be saturated or even unsaturated. Reference is made in this connection to British Patent Specification No. 1,230,605, page 5, line 50 to page 6, line 18. For details of the polyisocyanates, see page 5, lines 25 to 50 of the aforementioned British Patent Specification. All the polyisocyanates mentioned in addition to those already specified can also be used in accordance with the invention.

The advantage of using linear longer-chain monoalcohols for producing the monoisocyanate compounds is inter alia that they are less hygroscopic and, for this reason, contain less water than short-chain alcohols. In cases where more than traces of water are present during adduct formation, hazing can occur through the formation of insoluble polyureas. This is undesirable so far as the subsequent use of these monoisocyanates for thixotropizing is concerned. The adducts of polyisocyanates, especially diisocyanates and short-chain alcohols, tend to crystallise out even more quickly than monoisocyanates obtained by reacting for example tolylene diisocyanate, isophorone diisocyanate or hexamethylene diisocyanate with nonyl alcohol, isotridecyl alcohol or stearyl alcohol. The alcohol can be selected in particular in accordance with the binder to be thixotropized. Particularly high compatibility levels and, hence, stabilisation of the thixotropic state can be obtained by adapting the alcohol component in the monoisocyanate to the type of binder.

In this case, thixotropizing is preferably carried out by mixing the binder component to be thixotropized with the polyamine and subsequently stirring in the isocyanate compounds. In this case, too, the effect of the thixotropizing addition is considerably enhanced if the reaction is carried out at the elevated temperatures referred to above. Accordingly, it is possible to obtain highly thixotropic binders with only small quantities of the thixotropizing constituent. Thus, the technically desired results can be obtained with only 0.1 to about 2% by weight, preferably with about 0.1 to 1% by weight, of the thixotropizing constituent, based on solvent-free binder. This represents a significant improvement over all the corresponding proposals of the prior art.

It has proved to be of advantage to use the isocyanate compounds and, in particular, the monoisocyanates in an excess over the primary and/or secondary amino groups ready for reaction. This ensures that no free amine is actually left in the binder. Free amino groups can give rise to undesirable effects. The excess of free isocyanate groups is harmless. In many cases, standard commercial binder systems contain other isocyanate-reactive constituents such as alcohols, oximes and, above all, generally limited quantities of moisture. The quota of isocyanate groups present in excess over the reactive amino groups reacts more slowly with such compounds and/or with any reactive groups of the binder that are present. In any event, the isocyanate groups disappear completely after a short time so that no troublesome effects need be expected from them. The decisive factor is that, by virtue of their particularly high reactivity with isocyanate groups, the reactive amino groups are always the first to react, thus ensuring formation of the predetermined polyurea adduct. It can be of advantage to use the isocyanate in an excess of 10 to 100 equivalent % over the reactive amino groups. It is generally preferred to use an excess of 15 to 50 equivalent %.

The monoisocyanates of the kind just described can be used in admixture with other monoisocyanate compounds.

According to the invention, it is also possible, even with very small quantities of the polyurea adduct formed in situ, to obtain favourable anti-sedimentation properties without at the same time producing a heavily pronounced gel character. This can be of importance in a number of applications; reference is made for example to fibre-reinforced unsaturated polyester resins or pigmented coating agents in whose case a high degree of flowability is required.

In one preferred embodiment of the invention, substantially anhydrous conditions are applied at least up to formation of the urea adduct involving reaction of all the isocyanate groups. The quantities of moisture normally present in the components of the coating agent are harmless in this embodiment. In fact, formation of the urea adduct can even be carried out in the presence of relatively small or relatively large quantities of water. In this case, it is necessary to ensure, preferably by rapidly mixing isocyanate and amine component, that the reaction between these two reactive groups is the preferred reaction.

According to the invention, it is readily possible to thixotropize not only binders as such or their solutions, but also complete paints which, in addition to the binder, contain pigments and additives for example.

In this case, the reactants are added to the finished paint. However, it is more favourable to thixotropize the binder alone or in admixture with a solvent or diluent, and subsequently to process the gel formed with the pigments and other additives, for example by grinding on a roll stand, in a bead mill or in a dissolver, to form the paint.

In the following Examples, the quality of the thixotropic state was assessed according to three aspects, namely the thixotropy adjusted, the viscosity developed and the flow properties of the product. The marks awarded are defined as follows:

thixotropy:
6 = very heavily thixotropic
5 = heavily thixotropic
4 = satisfactorily thixotropic
3 = weakly thixotropic
2 = very weakly thixotropic
1 = non-thixotropic viscosity:
4 = very difficult to stir
3 = difficult to stir
2 = satisfactorily stirrable
1 = readily stirrable flow properties:
4 = heavily ointment-like, pasty
3 = ointment-like, pasty
2 = weakly ointment-like, pasty
1 = non-ointment-like, pasty

TABLE 1

|  | 1 | 2 | 3 | 4 |
|---|---|---|---|---|
| Component (1) | | | | |
| long-oil linseed-oil alkyd, 60% in white spirit | 300.0 | 300.0 | 300.0 | 300.0 |
| cyclohexylisocyanate | | | 8.0 | |
| ethylglycol | 10.0 | 10.0 | | |
| 3,3'-dimethyl-4,4'-diamino dicyclohexylmethane | 5.3 | 5.3 | | 8.0 |
| Component (2) | | | | |
| 3,3'-dimethyl-4,4'-diamino dicyclohexylmethane | | | 8.0 | |
| tolylene diisocyanate | 3.26 | 3.26 | | |
| white spirit | 20.0 | 20.0 | 20.0 | 20.0 |
| cyclohexylisocyanate | 2.15 | | | |
| stearylisocyanate | | 5.06 | | |
| Thixotropy | 5 | 5 | 2–3 | 2–3 |
| Viscosity | 3 | 3–2 | 2 | 2 |
| Flow properties | 1 | 1 | 1–2 | 1–2 |
|  | clear | opalescent-hazy | slightly hazy | slightly hazy |

TABLE 2

|  | 5 | 6 | 7 | 8 | 9 | 10 |
|---|---|---|---|---|---|---|
| Component (1) | | | | | | |
| linseed oil varnish | 300.0 | | | | | |
| epoxide ester, 50% in xylene (60% epoxide resin, 40%, ricinene fatty acid) | | 300.0 | | | | |
| coal-tar pitch, 85% in xylene | | | 300.0 | | | |
| Gilsonite asphalt, 60% in xylene | | | | 300.0 | | |
| hydroxyl-group-containing polyester, viscosity at 75° C. 550–750 cP, 6.2–6.7% hydroxyl content | | | | | 300.0 | |
| hydroxyl-group-containing polyester-polyether, approx. 5000 cP, 100% 5% hydroxyl content | | | | | | 300.0 |
| xylylene diamine (0.1 val) (70% m- and 30% p-isomer) | 6.8 | 6.8 | 6.8 | 6.8 | 6.8 | 6.8 |
| Component (2) | | | | | | |
| cyclohexylisocyanate (0.102 val) | 12.8 | 12.8 | 12.8 | 12.8 | 12.8 | 12.8 |
| Thixotropy | 1–2 | 1–2 | 1–2 | 1–2 | 2 | 2–1 |
| Viscosity | 2 | 2–3 | 2 | 2 | 2 | 1–2 |
| Flow properties | 3 | 4 | 4 | 4 | 4 | 3 |
|  | slightly hazy | slightly opalescent, hazy | homogeneous | homogeneous | slightly opalescent | opalescent, hazy |

Component (2) is slowly added with stirring to component (1). The thixotropic and pasty properties appear immediately and up to 30 minutes after the two components have been mixed.

| 11 | 12 | 13 | 14 | 15 |

TABLE 2-continued

| Component (1) | | | | | |
|---|---|---|---|---|---|
| unsaturated polyester resin, 73% in styrene, viscosity 900–1100 cP at 20° C. | 300.0 | | | | |
| Copolymer, 75% of polyvinyl chloride/25% of polyvinyl isobutyl ether, 30% in xylene, softening point of the solid resin 48 to 52° C. | | 300.0 | | | |
| alkyd resin dilutable with water after neutralisation, 63% in butyl glycol, oil content 49%, acid number 46 | | | 300.0 | | |
| methyl silicone resin, 50% in xylene/butanol 8:2 | | | | 300.0 | |
| hydroxyl-group-containing branched polyether, viscosity 650 ± 100 cP | | | | | 300.0 |
| xylylene diamine (0.1 val) | 6.8 | 6.8 | 6.8 | 6.8 | 6.8 |
| Component (2) | | | | | |
| cyclohexylisocyanate (0.102 val) | 12.8 | 12.8 | 12.8 | 12.8 | 12.8 |
| Component 2 is slowly added with stirring to component 1. | | | | | |
| Thixotropy | 1–2 | 2 | 1 | 1 | 1 |
| Viscosity | 1–2 | 2 | 1 | 1 | 1 |
| Flow properties | 3 opalescent, hazy | 4 opalescent, hazy | 2–3 very hazy | 3 very hazy | 4 very opalesecent, hazy |

EXAMPLE 1

A thixotropized binder is prepared from components (1) and (2) in accordance with the following recipe:

Component (1)
300.0 g or long-oil linseed-oil alkyd resin, 60% in white spirit
  viscosity: 190–240 cP, 50% in white spirit
  oil content: 63%, phthalic acid anhydride content: 23%
6.8 g of xylylene diamine
306.8 isomer mixture: 70% m- and
  30% p-xylylene diamine Component (2)
13.0 g of cyclohexyl isocyanate
20.0 g of white spirit
33.0 g Component (2) is slowly added with stirring to component (1). A very pasty, thixotropic binder is immediately formed.

A white surface lacquer is then prepared with this thixotropic material in accordance with the following recipe:

240.0 g of long-oil linseed oil alkyd, 60% in white spirit
  viscosity: 190–240 cP, 50% in white spirit
  oil content: 63%, phthalic acid anhydride content: 23%
1.5 g of calcium naphthenate, 4% Ca
1.8 g of silicone oil, 2% in xylene
140.0 g of titanium dioxide rutile
10.0 g of barium sulphate, precipitated
393.3 g
  Grind once on a 3-roll mill
0.7 g of methylethyl ketoxime (anti-skin agent)
  stir
6.0 g of dry substance solution
100.0 g of thixotropic alkyd resin according to the invention
500.0 g
  stir thoroughly The lacquer thus obtained is subsequently diluted with white spirit to a spreadable consistency. The lacquer obtained is highly to heavily pasty-thixotropic and does not show any tendency to run when applied to vertical surfaces.

EXAMPLE 2

A complete, pigment-containing surface lacquer as a whole is thixotropized in this Example. The following procedure is adopted:

Component (1)
340.0 g or long-oil linseed-oil alkyd, 60% in white spirit
  viscosity: 190–240 cP, 50% in white spirit
  oil content: 63%, phthalic acid anhydride content: 23%
1.5 g of calcium naphthenate, 4% Ca
1.8 g of silicone oil, 2% in xylene
140.0 g of titanium dioxide rutile
10.0 g of barium sulphate, precipitated
493.3 g
  Grind once on a 3-roll mill
0.7 g of methylethyl ketoxime (anti-skin agent)
  stir
6.0 g of dry substance solution
500.0 g Component (2)
3.4 g of xylylene diamine
  isomer mixture: 70% m- and
    30% p-xylylene diamine
  Stir component (1) and component (2)

Component (3)
6.5 g of cyclohexyl isocyanate
10.0 g of white spirit
16.5 g

Component (3) is slowly added with stirring to the mixture of component (1) and component (2). After 1 hour, white spirit is added for spreadability. A highly to heavily pasty-thixotropic lacquer is formed which is easy to spread and does not show any tendency to run.

EXAMPLE 3

(a) 200 parts by weight (1 val) of isotridecyl alcohol are added with stirring at room temperature to 174 parts by weight (2 val) of tolylene diisocyanate (65% 2,4-isomer, 35% 2,6-isomer). Approximately one quarter of the alcohol is initially added at such a rate that the mixture has a reaction temperature of 60° to 80° C. The rest of the alcohol is then added over a period of another 30 minutes. The aforementioned temperature range is maintained by cooling. If necessary, heating at 80° C. is continued until the reaction product has an NCO-content of 11.2%.

The reaction described here is best carried out in the presence of an inert solvent. Aromatic or aliphatic hydrocarbons or even esters adapted to the subsequent application envisaged can be used as the solvents. The inert solvent is used for example in such a quantity that equivalent quantities of inert solvent and reactive isocyanate compound are present in the monoisocyanate reaction product.

(b) 168 parts by weight (2 val) of hexamethylene diisocyanate are reacted with 200 parts by weight (1 val) of isotridecyl alcohol in xylene or another high-boiling solvent. The reaction product has an NCO-content of 11.4%.

(c) 4 conventional binders are thixotropized with the monoisocyanates according to (a) and (b).

A vinyltoluene-modified alkyd resin, in the form of a 60% solution in xylene, is used as binder 1. Binder 2 is a long-oil linseed-oil alkyd resin diluted to a solids content of 60%. Binder 3 is a short-oil coconut alkyd resin with a solids content of 60% in xylene. Finally, binder 4 is a short-oil air-drying alkyd resin, again with a solids content of 60% in xylene.

300 g batches of the solvent-containing binders are mixed separately with 1.5 g of xylylene diamine, after which 12 g batches of the monoisocyanate compound dissolved in 12 g of solvent are stirred in.

TABLE 3

| Binder 1 | 300.0 | | | |
|---|---|---|---|---|
| Binder 2 | | 300.0 | | |
| Binder 3 | | | 300.0 | |
| Binder 4 | | | | 300.0 |
| xylylene diamine | 1.5 | 1.5 | 1.5 | 1.5 |
| | | | Stir ! | |
| Adduct Example 3a | 12.0 | 12.0 | | |
| Adduct Example 3b | | | 12.0 | 12.0 |
| White spirit | | 12.0 | | |
| Xylene | 12.0 | | 12.0 | 12.0 |
| | 325.0 | 325.0 | 325.0 | 325.0 |

All the products are clear, pasty gels. Binders 1 and 2 are typical air-drying systems. Binder 3 is a synthetic resin suitable for stoving purposes. Resistance to yellowing remains favourable where stoving is carried out with a melamine resin (for 20 minutes at 140° C.). Binder 4, which can be used both in air-drying systems and also for stoving resins, does not produce any signs of yellowing either.

EXAMPLE 4

Binders and binder systems typical of the field of stoving lacquers are thixotropized in the following. Three binder components (binders 1 to 3) according to the invention are initially thixotropized:

Binder 1

Short-oil, non-drying alkyd resin, 60% in xylene
oil content as triglyceride: 26%
phthalic acid anhydride content: approximately 49%
specific gravity at 20° C.: 1.19 g/cc.
acid number: 8
viscosity, 50% in xylene: 300–400 cP

Binder 2

Autocrosslinking thermosetting acrylate resin, 50% in butanol/xylene 1:1
acid number below 2
flow-out time from a DIN-cup 6=40–60 seconds (DIN 53211)
stoving temperature
  30 minutes at 180° C.
  or 20 minutes at 190° C.
  or 10 minutes at 200° C.

Binder 3

Crosslink- assisted acrylic resin, 50% in butanol/xylene 2:8.

Binders 1 and 3 are used in combination with melamine resins, urea resin or autocrosslinking acrylic resins for stoving lacquers.

In Examples 4a to c, these binders are thixotropized with urea adducts obtained by reacting a diamine with a monoisocyanate and small quantities of tolylene diisocyanate (isomer mixture of about 65% of tolyene-2,6diisocyanate and 35% of tolyene-2,4-diisocyanate) in the presence of the binder. Details are given in Table 4 below (where the figures quoted are parts by weight).

TABLE 4

| Examples | 4 | 5 | 6 |
|---|---|---|---|
| Binder 1 | 300.0 | | |
| Binder 2 | | 300.0 | |
| Binder 3 | | | 300.0 |
| 3,3'-dimethyl-4,4'-diamino-dicyclohexylmethane 0.05 val | 6.0 | 6.0 | 6.0 |
| tolylene diisocyanate 0.0253 val | 2.2 | 2.2 | 2.2 |
| 1-naphthyl isocyanate 0.0253 val | 4.3 | 4.3 | 4.3 |
| | 312.5 | 312.5 | 312.5 |
| Solids content | 52.0% | 52.0% | 52.0% |

The binder is thoroughly stirred with the diamine. The isocyanate components are then slowly added with stirring. The binders immediately become heavily pasty-thixotropic after stirring.

The thixotropized binders are then each worked up into a white lacquer. Binders 1 and 3 are processed with a melamine resin and pigment in accordance with the following basic receipe:

| Basic recipe | parts by weight |
|---|---|
| Binder | 41.0 |
| Melamine resin, 55% in butanol/xylene | 16.5 |
| Titanium dioxide rutile | 30.5 |
| Ethylglycol | 12.0 |
| | 100.0 |

The white stoving lacquers produced with the above thixotropic binders were ground once on a one-roll stand, applied to sheet metal and, in an upright position, were stoved in an oven for 30 minutes at 150° C. after an evaporation time of 5 minutes. The samples obtained did not show any signs of running, and the films were high-gloss and streak-free. After stoving, the colour was pure white. The dry layer thickness amounted to between 0.05 and 0.08 mm (single coating).

The thixotropic binder of Example 4b based on an autocrosslinking acrylic resin is mixed with the same, but non-thixotropized acrylic resin in a ratio of 1:1 (based on solids). This mixture is pigmented with 100% by weight of titanium dioxide rutile (based on binder).

The paint thus obtained was applied in a thick layer to metal sheets and stoved upright for 30 minutes at 150° C. The lacquer films did not show any signs of running in a dry film thickness of 0.05 to 0.08 mm (single coating). Stoving did not produce any yellowing or reduction in gloss.

I claim:

1. A thixotropic coating agent comprising a binder and a thixotroping agent; said thixotropizing agent comprising a urea adduct obtained by reacting (a) polyamine containing at least two amino groups, and (b) isocyanate including monoisocyanate compounds and diisocyanate compounds in the following mixing ratios: 30 to 70 equivalent % of isocyanate groups from the diisocyanate compound to 70 to 30 equivalent % of the monoisocyanate compound.

2. A thixotropic coating agent comprising a binder and a thixotropizing agent, wherein the thixotropizing agent comprises a urea adduct obtained by reacting (a) polyamine containing at least two amino groups, (b) isocyanate including monoisocyanate, in the presence of the binder; the isocyanate being adding in an amount to result in an excess of isocyanate groups over the amino groups; the excess of isocyanate groups being reacted with at least one of a monofunctional alcohol, oxime, amine and alkanolamines.

3. A thixotropic coating agent as claimed in claim 2, wherein the thixotropizing agent is present in a quantity of from 0.05 to 10% by weight, based on the coating agent.

4. A thixotropic coating agent as claimed in claim 2, wherein the isocyanate reacted as a whole are used in a quantity of 40 to 200 equivalent % of isocyanate groups, preferably 80 to 140 equivalent % of isocyanate groups, based on isocyanate-reactive primary and/or secondary amino groups.

5. A thixotropic coating agent as claimed in claim 2, the polyamine including primary polyamine.

6. A thixotropic coating agent as claimed in claim 2, the isocyanate including diisocyanate.

7. A thixotropic coating atent as claimed in claim 5, the isocyanate including diisocyanate.

8. A thixotropic coating agent as claimed in claim 2, wherein amino groups that have not been arrested through formation of the urea adduct, if any, are reacted with other amine-reactive components, especially epoxide groups.

9. A thixotropic coating agent as claimed in claim 2, wherein there is an excess of isocyanate groups over amino groups, and the excess isocyanate groups are reacted with at least one of monofunctional alcohols, oximes, amines and alkanolamines.

10. A process for the production of thixotropic coating agents, wherein a liquid binder is mixed with polyamino containing at least two amino groups which are primary or secondary amino groups, and the resulting mixture is reacted with isocyanate including monoisocyanate, added in an amount to result in an excess of isocyanate group over amino groups, for production in the binder of a urea adduct of the polyamine and isocyanate.

11. A process as claimed in claim 10, wherein a monofunctional component for arresting excess isocyanate groups is included in the binder before reaction with the isocyanate, said monofunctional component being selected from monofunctional alcohol, oxime, amine and alkanolamine.

12. A thixotropic coating agent as claimed in claim 2, the binder being at least 20% by weight.

13. A thixotropic coating agent according to claim 6, wherein said reaction product is the reaction product of diisocyanate with monoalcohol containing at least 5 carbon atoms.

14. A thixotropic coating agent according to claim 13, said monoalcohol containing at least 8 carbon atoms.

15. A thixotropic coating agent as claimed in claim 6, wherein the quantity of diisocyanate is limited in such a way that said amino groups of the polyamine are present in a stoichiometric excess over the isocyanate groups from the diisocyanates.

16. A thixotropic coating agent as claimed in claim 2, wherein a reaction product of polyisocyanate and monoalcohols with approximately one free isocyanate group in the molecule, is used, in part at least, as the monoisocyanate compound.

17. A process as claimed in claim 10, wherein the reaction is carried out at room temperature or at elevated temperatures of up to about 100° C., preferably at temperatures of from 40° to 80° C.

18. A process as claimed in claim 10, wherein binders responding only weakly to thixotropizing are mixed with limited quantities of highly thixotropizable compatible binders.

19. A process as claimed in claim 10, wherein only part of the final coating agent system and, optionally, only part of the binder is thixotropized and the gel thus formed subsequently mixed with all the other components.

* * * * *